(12) United States Patent
Lee et al.

(10) Patent No.: US 12,508,104 B2
(45) Date of Patent: Dec. 30, 2025

(54) METHOD FOR OPTIMIZING ARCHLINE AND APPARATUS USING SAME

(71) Applicant: MEDIT CORP., Seoul (KR)

(72) Inventors: Sung Hoon Lee, Seoul (KR); Jin Young Kim, Seoul (KR)

(73) Assignee: MEDIT CORP., Seoul (KR)

( * ) Notice: Subject to any disclaimer, the term of this patent is extended or adjusted under 35 U.S.C. 154(b) by 312 days.

(21) Appl. No.: 18/034,279

(22) PCT Filed: Oct. 29, 2021

(86) PCT No.: PCT/KR2021/015402
§ 371 (c)(1),
(2) Date: Apr. 27, 2023

(87) PCT Pub. No.: WO2022/092882
PCT Pub. Date: May 5, 2022

(65) Prior Publication Data
US 2023/0404708 A1    Dec. 21, 2023

(30) Foreign Application Priority Data

Oct. 30, 2020  (KR) .................. 10-2020-0143824
Apr. 6, 2021   (KR) .................. 10-2021-0044417

(51) Int. Cl.
*A61C 7/00*     (2006.01)
*A61C 9/00*     (2006.01)
*G06T 19/20*    (2011.01)

(52) U.S. Cl.
CPC ............ *A61C 7/002* (2013.01); *A61C 9/0046* (2013.01); *G06T 19/20* (2013.01); *A61C 2007/004* (2013.01); *G06T 2219/2004* (2013.01)

(58) Field of Classification Search
None
See application file for complete search history.

(56) References Cited

U.S. PATENT DOCUMENTS

| 8,118,593 | B2 | 2/2012 | Imgrund et al. |
| 9,326,831 | B2 | 5/2016 | Cheang |
| 9,844,420 | B2 | 12/2017 | Cheang |
| 2016/0175068 | A1 | 6/2016 | Cai et al. |
| 2020/0100871 | A1* | 4/2020 | Wang .................. G06F 17/18 |

(Continued)

FOREIGN PATENT DOCUMENTS

| EP | 1 191 896 B1 | 6/2008 |
| JP | 5337472 B2 | 11/2013 |
| KR | 10-2073479 B1 | 2/2020 |

(Continued)

OTHER PUBLICATIONS

Steven D. Marshall et al., "Development of the curve of Spee", American Journal of Orthodontics and Dentofacial Orthopedics, Sep. 2008, pp. 344-352, vol. 134, No. 3.

(Continued)

*Primary Examiner* — Daniel F Hajnik
*Assistant Examiner* — Jed-Justin Imperial
(74) *Attorney, Agent, or Firm* — Sughrue Mion, PLLC

(57) ABSTRACT

An archline optimization method according to the present disclosure includes generating a Spee curve based on an arc of a circle having a predetermined radius of curvature, and changing a three-dimensional archline based on the Spee curve.

12 Claims, 17 Drawing Sheets

(56) References Cited

U.S. PATENT DOCUMENTS

2021/0093421 A1* 4/2021 Michaeli .................. A61C 7/08

FOREIGN PATENT DOCUMENTS

| KR | 10-209707 B1 | 4/2020 |
| WO | 2020/026117 A1 | 2/2020 |
| WO | 2020/069446 A1 | 4/2020 |

OTHER PUBLICATIONS

International Search Report of PCT/KR2021/015402 dated Feb. 3, 2022 [PCT/ISA/210].
Extended European Search Report dated Sep. 9, 2024, issued in European Application No. 21886876.8.

* cited by examiner

METHOD FOR OPTIMIZING ARCHLINE AND APPARATUS USING SAME

CROSS REFERENCE TO RELATED APPLICATIONS

This application is a National Stage of International Application No. PCT/KR2021/015402, filed Oct. 29, 2021, claiming priorities to Korean Patent Application No. 10-2020-0143824, filed Oct. 30, 2020 and Korean Patent Application No. 10-2021-0044417, filed Apr. 6, 2021, the entire disclosures of which are incorporated herein by reference.

TECHNICAL FIELD

The present disclosure relates to an archline optimization method and an apparatus using the same, and more particularly, to an archline optimization method for optimizing the shape of an archline to the oral cavity of a patient based on a Spee curve for the oral cavity viewed from the side, and an apparatus using the same.

BACKGROUND

In an orthodontic plan, conventionally, an impression of a patient's oral cavity is taken to obtain a plaster model, and then a prosthetic treatment product is manufactured to match the plaster model and is provided to the patient. Errors that occur when making the plaster model make it difficult to provide a precise prosthetic treatment product to the patient. In order to solve this problem, methods for acquiring information about the oral cavity as data have been continuously researched and developed.

With the development of three-dimensional scanning technology, three-dimensional surface model data can be acquired by scanning the inside of an oral cavity including a patient's teeth, gingiva, and dental arch. Through the acquired three-dimensional surface model data, therapists are able to perform various active activities such as virtually applying prosthetic treatment products, simulating orthodontic plans, determining carious teeth, and determining whether or not to occlude.

On the other hand, in establishing a treatment plan through the acquired three-dimensional surface model data, there is a need to modify the treatment plan that has already been presented. At this time, a method for establishing an individualized treatment plan that meets the needs of users and/or patients by changing an archline generated based on tooth data among the acquired data is being studied.

Meanwhile, an orthodontic program makes the archline and then makes an array of teeth to be corrected by fitting teeth to the archline. The 'curvature of an occlusal plane' viewed from the side of such a dental arch-shaped archline is called a curve of Spee.

Generally, in orthodontics, as shown in FIG. 1, the curvature along a circle of approximately a certain radius (d') centered on a glabella (Px) is determined as a Spee curve. At this time, the curvature along the circle with the radius of 4 inches is regarded as an ideal Spee curve. The more accurate the curvature setting of the Spee curve is, the more accurately a smile line can be obtained, which can provide the most suitable treatment for a patient's oral cavity.

Here, the smile line is made according to the tooth line, the tooth shape, the gingiva degree and gingiva line exposed when smiling, the length and thickness of the lips, the length of the philtrum, and the activity degree and direction of muscles around the lips and related muscles, and the patient can have a desired smile line through orthodontic treatment.

According to U.S. Pat. No. 9,844,420 B2, which is prior art, a user must directly change a Spee curve defined by default, and according to U.S. Pat. No. 8,118,593 B2, which is also prior art, an extent of change is limited to the curvature of a circle, specifically, it does not suggest a solution to how to set the radius of the circle and where to set the center of the circle. In addition, in order to provide optimal treatment to the patient, the Spee curve must be utilized in a three-dimensional space, and thus an archline must be optimized based on the generated Spee curve. However, the prior art technologies above do not suggest a method of optimizing an archline based on the generated Spee curve.

SUMMARY

In order to solve the above problems, various embodiments of the present disclosure provide an archline optimization method for generating at least two points on a three-dimensional model acquired by scanning an oral cavity, generating a Spee curve having a predetermined radius of curvature based on the points, and optimizing an archline based on the Spee curve.

In addition, various embodiments of the present disclosure provide an archline optimization apparatus for analyzing an inputted three-dimensional model to generate at least two points, generating a Spee curve having a predetermined radius of curvature based on the points, and optimizing an archline based on the Spee curve.

The technical objects of the present disclosure are not limited to the above-mentioned technical objects, and other technical objects not mentioned will be clearly understood by those skilled in the art from the description below.

According to an embodiment of the present disclosure, an archline optimization method includes: generating a Spee curve based on an arc of a circle having a predetermined radius of curvature; and changing a three-dimensional archline based on the Spee curve.

The archline optimization method may further include: generating an initial archline, wherein changing the archline includes changing the initial archline based on the Spee curve.

Changing the archline may include: projecting the initial archline on a predetermined plane; changing a position of a projected archline obtained by projecting the initial archline to a position of the Spee curve generated on the predetermined plane; and returning the projected archline changed to the position of the Spee curve to a three-dimensional space by a projected distance.

The initial archline may be generated on the basis of a predetermined tooth in a three-dimensional model of a patient's teeth acquired by scanning the teeth before orthodontic treatment.

In generating the Spee curve, at least two points constituting the arc are generated on a predetermined plane, and the Spee curve may be a two-dimensional arc on the predetermined plane including the points.

At least two points constituting the arc may be generated based on a plurality of teeth and projected on a predetermined plane, and the Spee curve may be a two-dimensional arc on the predetermined plane including the points.

At least two points constituting the arc may include at least one central point generated based on an incisor among teeth and at least one side point generated based on a molar tooth among the teeth.

At least some of the at least two points constituting the arc may include a side point generated at an intersection between a line passing through a contour point of a molar tooth among the teeth and tangent to the contour of the molar tooth and a line horizontal to the rearmost contour point of the molar tooth.

The contour point of the molar tooth may be a reference point on an archline tangent to the contours of at least some of the teeth.

At least some of the at least two points constituting the arc may include a central point generated through an outer surface of a boundary box of the teeth.

The central point may be generated between boundary boxes of incisors among the teeth.

The central point may be a center of a line connecting front opposite vertices of the boundary boxes of the incisors.

The Spee curve may have a radius of curvature that minimizes a deviation from the ends of the teeth.

According to another embodiment of the present disclosure, an archline optimization method includes: generating a two-dimensional Spee curve having a predetermined radius of curvature; and generating a three-dimensional archline based on the Spee curve, wherein a projection of the archline on a predetermined plane is the same as the Spee curve.

The archline may be generated by changing an initial archline generated from a three-dimensional model of a patient's teeth acquired by scanning the teeth before orthodontic treatment, based on the Spee curve.

The Spee curve may include a projected point at which at least two points generated based on a three-dimensional model of a patient's teeth acquired by scanning the teeth before orthodontic treatment are projected on the predetermined plane.

According to the present disclosure in some embodiments, there is an advantage in that a user can generate a sophisticated Spee curve based on the three-dimensional model of the patient's oral cavity without acquiring a three-dimensional model of the patient's entire face, and the archline is optimized through the Spee curve.

In addition, since the Spee curve is acquired based on the three-dimensional model of the patient's oral cavity and the archline is optimized, there is an advantage in that the system resources can be saved and the archline can be quickly optimized.

In addition, there is an advantage in that an individual Spee curve can be generated for each three-dimensional model to provide a so-called patient-customized treatment plan most suitable for the patient.

EXPLANATION OF REFERENCE NUMERALS

Figure 1:
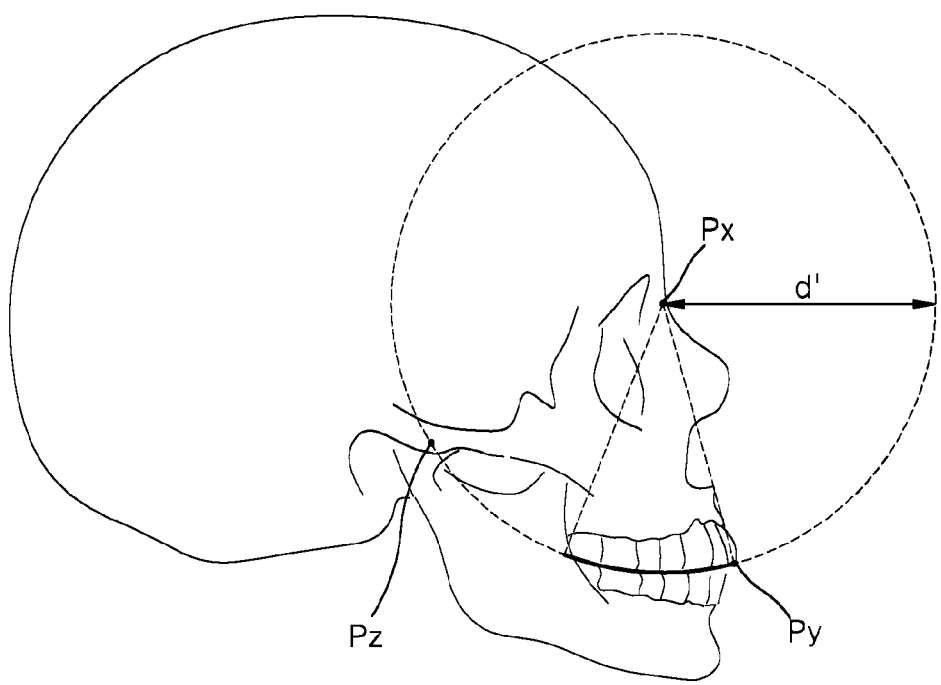
FIG. 1 shows a comparative example of an archline optimization method according to the present disclosure.

S110: acquiring three-dimensional model
S120: segmenting teeth
S130: generating initial archline
S140: generating points based on teeth
S150: projecting points on predetermined plane
S160: generating Spee curve
S170: changing archline
100: three-dimensional model
200: archline
300: teeth
10: Spee curve generation apparatus
11: scanning unit 12: three-dimensional model generating unit
13: tooth identification unit 14: archline generating unit
15: point generating unit 16: Spee curve generating unit
17: archline applying unit 18: display unit

DETAILED DESCRIPTION

Hereinafter, some embodiments of the present disclosure will be described in detail through the exemplary drawings. In adding reference numerals to components of the drawings, it should be noted that the same components have the same reference numerals to the extent possible even if they are shown on different figures. In addition, in describing an embodiment of the present disclosure, if it is determined that a detailed description of a related known configuration or function hinders understanding of the embodiment of the present disclosure, the detailed description thereof will be omitted.

In describing the components of the embodiment of the present disclosure, the terms such as first, second, A, B, (a), and (b) may be used. These terms are merely used to distinguish the component from other components, and the nature, order, or sequence of the corresponding component is not limited by the term. In addition, unless defined otherwise, all terms used herein, including technical or scientific terms, have the same meaning as commonly understood by those skilled in the art to which the present disclosure pertains. Terms such as those defined in commonly used dictionaries should be interpreted as having a meaning consistent with the meaning in the context of the related art, and they should not be interpreted in an ideal or excessively formal meaning unless explicitly defined in the present disclosure.

Figure 2:
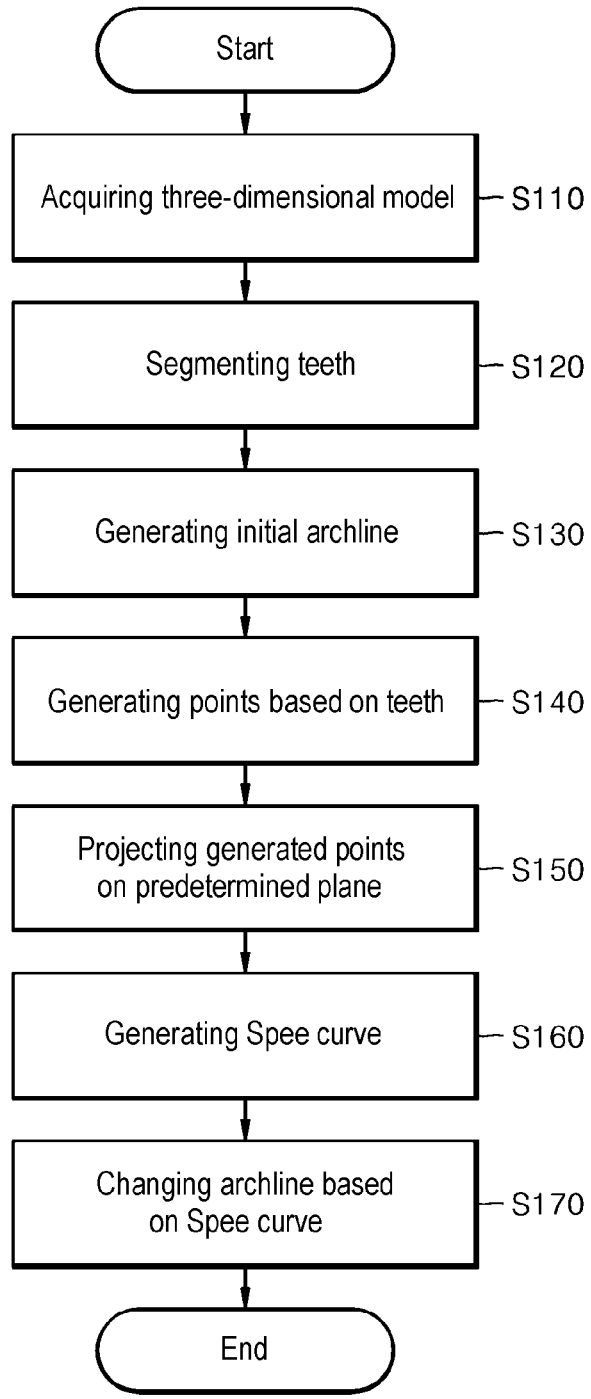
FIG. 2 is a flowchart of the archline optimization method according to the present disclosure.

FIG. 2 is a flowchart of an archline optimization method according to the present disclosure.

Referring to FIG. 2, a Spee curve generation method according to the present disclosure includes a step S110 of acquiring a three-dimensional model by scanning an oral cavity of a patient, a step S120 of segmenting teeth of the obtained three-dimensional model, a step S130 of generating an initial archline, a step S140 of generating at least two points based on a plurality of teeth, a step S150 of projecting the points on a predetermined plane, a step S160 of generating a Spee curve, and a step S170 of changing the archline.

Hereinafter, the detailed execution process of each step will be described in detail.

Figure 3:
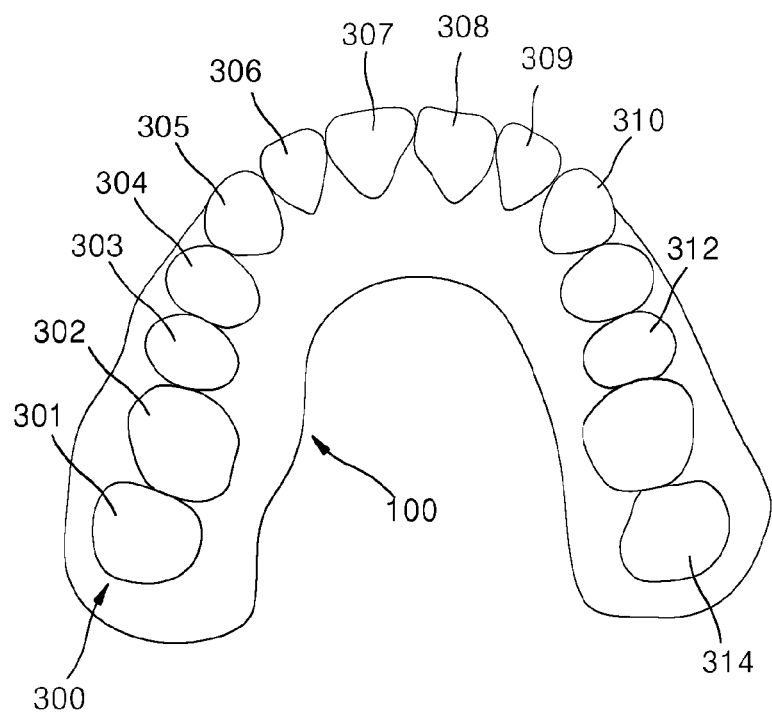
FIG. 3 is a view for explaining a three-dimensional model used in the archline optimization method according to the present disclosure.

FIG. 3 is a view for explaining a three-dimensional model 100 used in the archline optimization method according to the present disclosure. Referring to FIGS. 2 and 3, in order to generate a Spee curve and optimize an archline based on the generated Spee curve, first, data of the three-dimensional model 100 for the inside of the patient's oral cavity are acquired (S110). The three-dimensional model 100 for the inside of the oral cavity may be acquired through a three-dimensional scanner. On the other hand, the three-dimensional model 100 for the inside of the oral cavity may be data acquired by scanning the patient's actual oral cavity, but if necessary, a plaster model obtained by taking an impression of the patient's actual oral cavity with alginate or the like may be converted into data. The three-dimensional scanner may be a table scanner having a tray, or an intraoral scanner that is drawn in or out of the patient's oral cavity. The three-dimensional model acquired using the three-dimensional scanner may represent information about teeth, gums, and dental arches.

The Spee curve generation method according to the present disclosure may include a step S120 of segmenting teeth from the acquired three-dimensional model. Segmenting teeth means individually classifying data corresponding to teeth in a three-dimensional model. A tooth can be distinguished from a gingiva using information such as color and curvature of the tooth and gingiva. In addition, it is possible to identify each tooth by using artificial intelligence learning. For example, it is possible to distinguish which tooth each of the teeth of the three-dimensional model is through learned data on the position, shape, and curvature of the teeth. For example, a tooth with a relatively low height and located inside the oral cavity can be distinguished as a molar tooth, and a tooth with a relatively high height and located on the outer front surface of the oral cavity can be distinguished as an incisor (front tooth). In addition, a premolar tooth, a canine, etc. can be individually distinguished. Each of the distinguished teeth may be assigned a unique tooth number. One side molar tooth may be named as tooth #1 and tooth numbers may be assigned in the order of adjacency. For example, the tooth numbers may be assigned based on a universal numbering system widely used internationally. For example, on the basis of a patient having 14 teeth in the maxilla, the tooth numbers such as tooth #1 301, tooth #2 302, tooth #3 303, tooth #4 304, tooth #5 305, tooth #6 306, tooth #7 304, and tooth #8 308 from the first molar tooth on the left side of the maxilla may be assigned, and the three-dimensional model (100) can be analyzed through each assigned tooth number. In this way, when the teeth are segmented by the step S120 of segmenting the teeth, points used to generate a Spee curve to be described below may be acquired based on the segmented teeth.

However, the assigned tooth numbers may be sequentially assigned according to a predetermined criterion, and somewhat differently from that shown in FIG. 3, and when the patient has 16 teeth in the maxilla or mandible, a total of 16 teeth are distinguished and a unique tooth number may be assigned to each of the distinguished teeth. For example, the tooth numbers such as tooth #1 to #16 may be assigned sequentially from the first molar tooth on the left side of the maxilla to the last molar tooth on the right side of the maxilla, and the three-dimensional model 100 may be analyzed through each assigned tooth number.

Hereinafter, the step S130 of generating the initial archline will be described.

Figure 4:
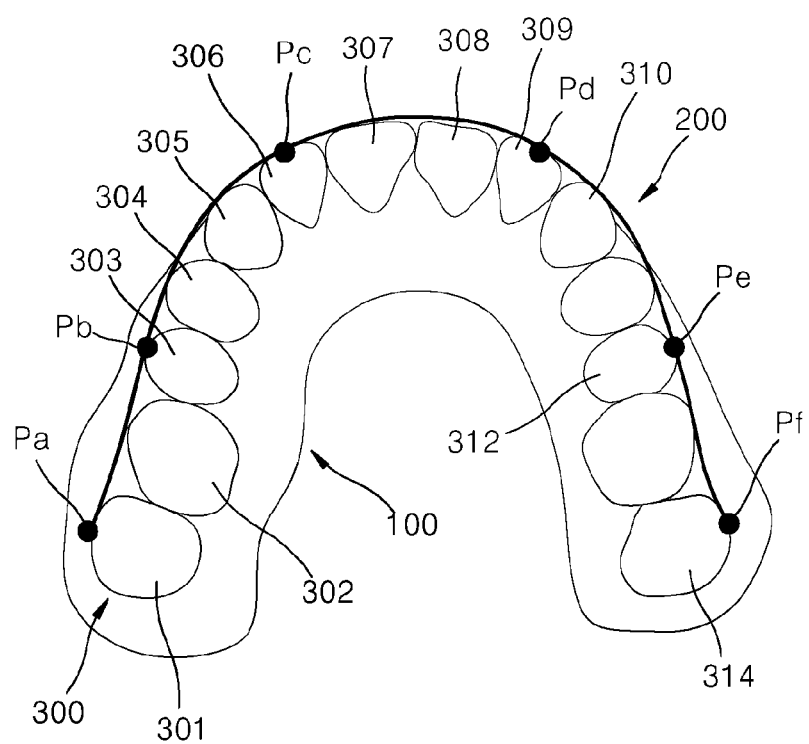
FIGS. 4 and 5 are views for explaining a process of generating an initial archline in the three-dimensional model used in the archline optimization method according to the present disclosure.
Figure 5:
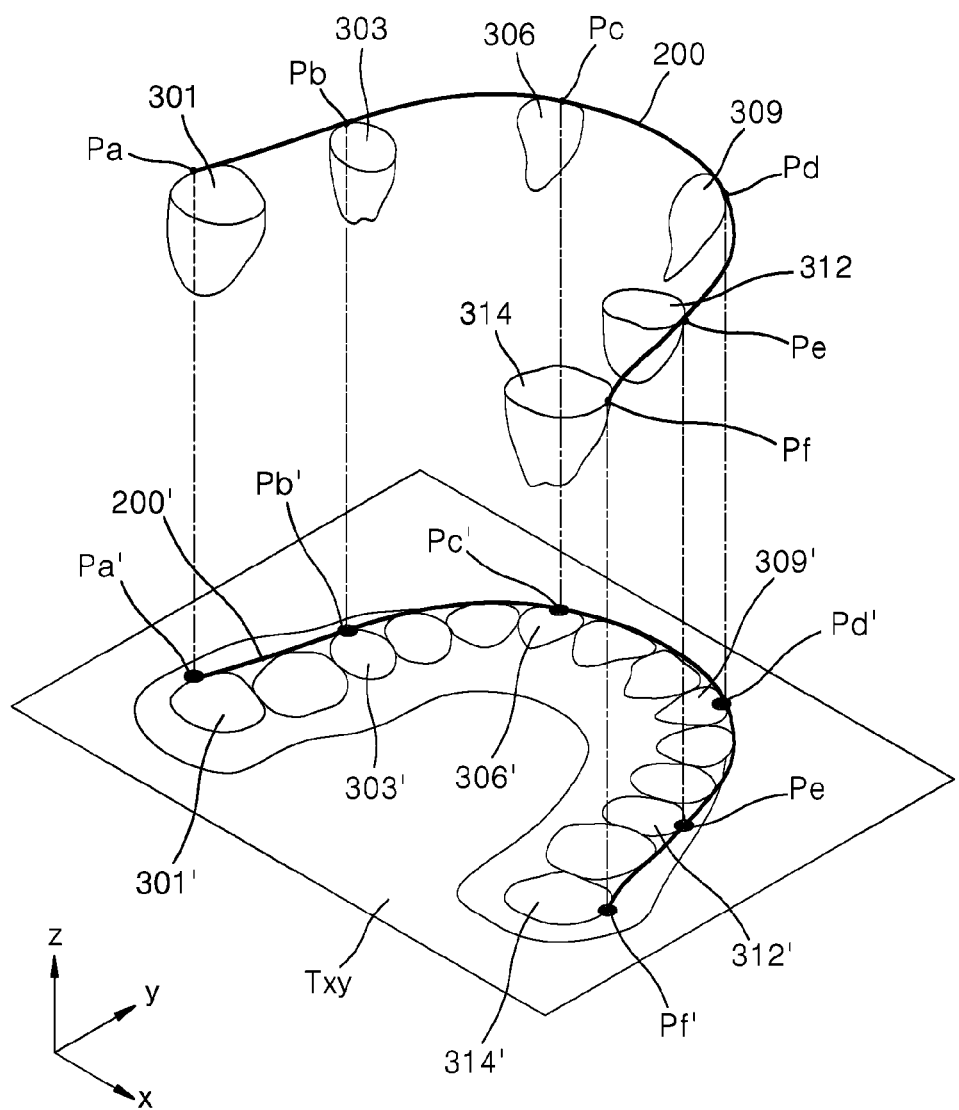

FIGS. 4 and 5 are views for explaining a process of generating an initial archline 200 in the three-dimensional model used in the Spee curve generation method according to the present disclosure.

The archline may mean a curve representing the patient's dental arch. At this time, the initial archline 200 may be formed according to a predetermined criterion. More specifically, the initial archline 200 may be generated on the basis of a predetermined tooth in the three-dimensional model of teeth acquired by scanning the patient's teeth before orthodontic treatment.

The initial archline 200 may be formed to pass through the contours of some of a plurality of teeth. At this time, the fact that the initial archline 200 passes through the contours of some of the plurality of teeth may be interpreted as the initial archline 200 circumscribing the contours of some of the plurality of teeth. In addition, the fact that the initial archline 200 passes through the contours of some of the plurality of teeth may mean that the initial archline 200 penetrates the contours of some of the plurality of teeth. As one example, on the basis of the maxilla of a patient having 14 teeth, the initial archline 200 may be formed to be tangent to tooth #1 301, tooth #3 303, and tooth #6 306. In addition, the initial archline 200 may be formed to be tangent to tooth #9 309, tooth #12 312, and tooth #14 314. The initial archline 200 may be formed to be tangent to contour points Pa, Pb, Pc, Pd, Pe, and Pf located on the contour of a predetermined tooth. However, this is merely illustrative, and the initial archline 200 can be of any shape as long as it is formed to pass through the contour of the predetermined tooth, and two or more contour points through which the initial archline 200 passes may be formed on one tooth through the predetermined tooth. The shape of the initial archline 200 may be changed according to a user's input signal, and the teeth of the three-dimensional model 100 may be moved in parallel to correspond to the changed shape of the initial archline 200.

Hereinafter, the process of generating the initial archline 200 will be described in more detail. Meanwhile, in FIG. 5, only necessary portions are illustrated for convenience of explanation, and the remaining portions are omitted.

Referring to FIG. 5, the three-dimensional model is projected on an xy projection plane (Txy). At this time, projected data may express the contour of each tooth. For example, on the basis on the maxilla of the patient with 14 teeth, all the contours of the teeth including tooth #1 301, tooth #3 303, tooth #6 306, tooth #9 309, tooth #12 312, and tooth #14 314 may be displayed on the xy projection plane (Txy). That is, the teeth may include projected tooth #1 301', projected tooth #3 303', projected tooth #6 306', projected tooth #9 309', projected tooth #12 312', and projected tooth #14 314'. On the other hand, the projected teeth have contour lines on the xy projection plane (Txy), and a projection archline 200' passing through the contour lines of some of the projected teeth may be generated. At this time, for example, the projection archline 200' may be a curve tangent to the projected teeth 301', 303', 306', 309', 312', and 314' while passing through the contour point Pa' of the projected tooth #1 301', the contour point Pb' of the projected tooth #3 303', the contour point Pc' of the projected tooth #6 306', the contour point Pd' of the projected tooth #9 309', the contour point Pe' of the projected tooth #12 312', and the contour point Pf of the projected tooth #14 314'. However, this is merely illustrative, and the projection archline 200' can be of any shape as long as it is formed to pass through the contours of some of the projected teeth, and two or more contour points through which the projection archline 200' passes may be formed on one projected tooth through a predetermined projected tooth.

The generated projection archline 200' may be applied to the three-dimensional model 100. More specifically, the projection archline 200' may be applied to the three-dimensional model 100 to form a three-dimensional curve passing through the contour points Pa, Pb, Pc, Pd, Pe, and Pf on the three-dimensional model 100 corresponding to the respective contour points Pa', Pb', Pc', Pd', Pe', and Pf of the projected teeth. That is, the initial archline 200 means the three-dimensional curve where the projection archline 200' is applied to the three-dimensional model 100.

Meanwhile, based on the projected teeth, a buccal line of each of the projected teeth may be generated. A buccal line of a projected predetermined tooth may be generated based on the tooth center of a tooth adjacent to the tooth. For example, on a virtual circle passing through the tooth center of the projected predetermined tooth and the tooth centers of the projected teeth located on both sides of the predetermined projected tooth, the buccal line of the projected predetermined tooth may be defined as at least a portion of a straight line passing through the tooth center of the predetermined projected tooth from the center of the virtual circle. In addition, the contour points Pa', Pb', Pc', Pd', Pe', and Pf of the respective projected teeth may also be obtained using the buccal line generated as described above. For example, the contour points Pa', Pb', Pc', Pd', Pe', and Pf may be defined as some or all of points where the buccal line and the contour lines of the respective projected teeth intersect. Meanwhile, the buccal line may be used to obtain another first side point P3' which will be described later.

Hereinafter, the step S140 of generating a Spee curve based on the three-dimensional model and generating points for optimizing an archline will be described in detail. The archline optimization method according to the present disclosure may include the step S140 of generating at least two points based on the plurality of teeth. At this time, the points may be generated through predetermined data processing based on the contours of the teeth of the three-dimensional model 100. The data processing may use a boundary box surrounding the teeth or a tangential line extending from a specific position of a predetermined tooth. However, it is not limited to this method, and it is possible to generate points that are the basis for generating a Spee curve and optimizing an archline using information of the three-dimensional model.

Only a portion of the three-dimensional model may be used in order to generate the points. More specifically, even if all of the maxilla data, the mandible data, and the occlusion data are acquired by scanning the oral cavity of a patient, it is possible to use only one of them. For example, only the maxilla data may be used to generate the Spee curve.

Meanwhile, the points include at least one central point and at least one side point. At this time, the central point is generated based on an incisor of the teeth of the three-dimensional model, and the side point is generated based on a molar tooth of the teeth of the three-dimensional model. For example, on the basis on a patient having 14 teeth in the maxilla, the incisor may mean tooth #7 and tooth #8 corresponding to a central incisor, and the molar tooth may mean at least one of tooth #1 to tooth #3 and tooth #12 to tooth #14. More specifically, the molar tooth which is the basis for generating the side point may be at least one of tooth #1 and tooth #14 located at the innermost side of the oral cavity of the patient. However, it is not limited to these tooth numbers, and suitable tooth (teeth) capable of generating the central point and the side point may be used.

As another example, on the basis on a patient with 16 teeth in the maxilla, the incisor may mean tooth #8 and tooth #9 corresponding to the central incisor, and the molar tooth may mean at least one of tooth #1 to tooth #3 and tooth #14 to tooth #16. More specifically, the molar tooth which is the basis for generating the side point may be at least one of tooth #1 and tooth 16 #located at the innermost side of the oral cavity of the patient.

The reason that at least one central point and at least one side point are needed to generate a Spee curve and optimize an archline based on the Spee curve is that the central point and the side point represent both ends of a tooth region of the three-dimensional model viewed from one side, respectively, so that it is easy to express both ends of the Spee curve. By determining the central point and the side point as both ends of the Spee curve, a simple and sophisticated Spee curve can be acquired and the archline can be optimized based on this.

Hereinafter, one example for generating points (e.g., the central point and the side point) will be described in detail.

Figure 6:
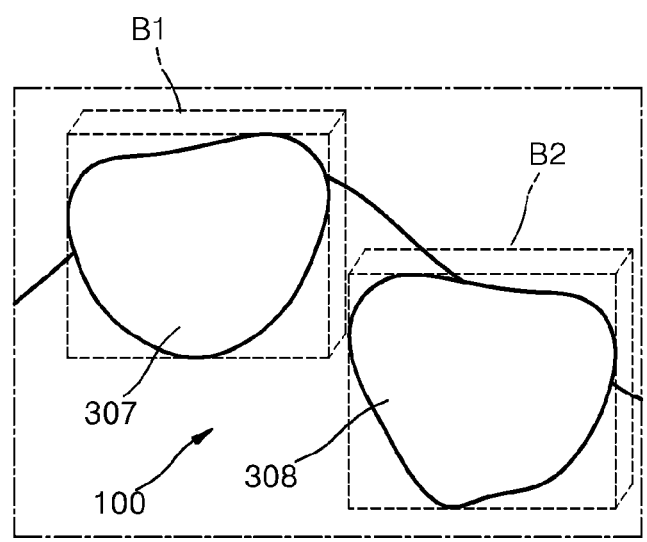
FIG. 6 is a view for explaining a process of generating a boundary box in the archline optimization method according to the present disclosure.
Figure 7:
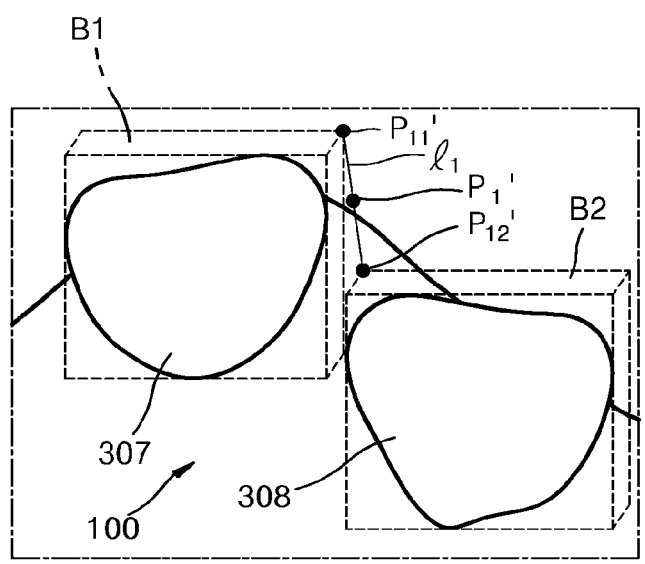
FIG. 7 is a view for explaining a process of generating a central point from the boundary box.

FIG. 6 is a view for explaining a process of generating a boundary box in the archline optimization method according to the present disclosure, and FIG. 7 is a view for explaining a process of generating the central point from the boundary box.

Referring to FIGS. 6 and 7, at least some of the points include the central point generated through the outer surfaces of boundary boxes of the teeth. At this time, the central point may be generated in the middle of the teeth included in the three-dimensional model, and the central point may be generated at one ends of the teeth when viewed from the side of the three-dimensional model. For example, the central point may be generated between boundary boxes of incisors among the teeth.

Each boundary box may have a rectangular parallelepiped structure enclosing a specific tooth, and the enclosed tooth does not protrude outside the boundary box. The boundary box may be formed to a size that minimizes an empty space between the boundary box and the tooth while enclosing the tooth. As shown in FIG. 6, on the basis of a patient having 14 teeth in the maxilla, tooth #7 307 and tooth #8 308 are formed as incisors, and boundary boxes B1 and B2 enclosing the incisors, respectively, are formed.

On the other hand, referring to FIG. 7, the central point may be the center of a line connecting front opposite vertices of the boundary boxes of the incisors. More specifically, the front vertex P11' of the first boundary box B1 and the front vertex P12' of the second boundary box B2 are connected to generate a virtual first line l1, and the center of the first line l1 may be determined as the central point P1'. By determining the central point P1' in this way, it is possible to reduce the number of points used to generate the left Spee curve and the right Spee curve, thereby saving system resources.

However, the central point P1' is not generated only by being limited to the above-described contents, and one point of the boundary box enclosing each incisor may be determined as the central point P1'. For example, when tooth #7 307 and tooth #8 308 are spaced apart by a predetermined distance or more, using the above method may prevent generating a sophisticated Spee curve. Therefore, in this case, the central point P1' on the side including tooth #1 301 to tooth #7 307 may be one point at a corner where the front surface and the upper surface meet in the boundary box B1 of tooth #7 307. In addition, the central point P1' on the side including tooth #8 308 to tooth #14 314 may be one point at a corner where the front surface and the upper surface meet in the boundary box B2 of tooth #8 308. In this way, when a different central point is determined for each side, there is an advantage in that Spee curves conforming to the three-dimensional model can be acquired even when the incisors 307 and 308 are spaced apart from each other by a predetermined distance or more.

In addition, the central point P1' may be determined as a point at which the slope inclination on the plane becomes 0 in the archline to be described later, and any method capable of expressing the foremost portion of the teeth may be used.

Hereinafter, a process of generating the side point used to generate the Spee curve will be described in detail.

Figure 8:
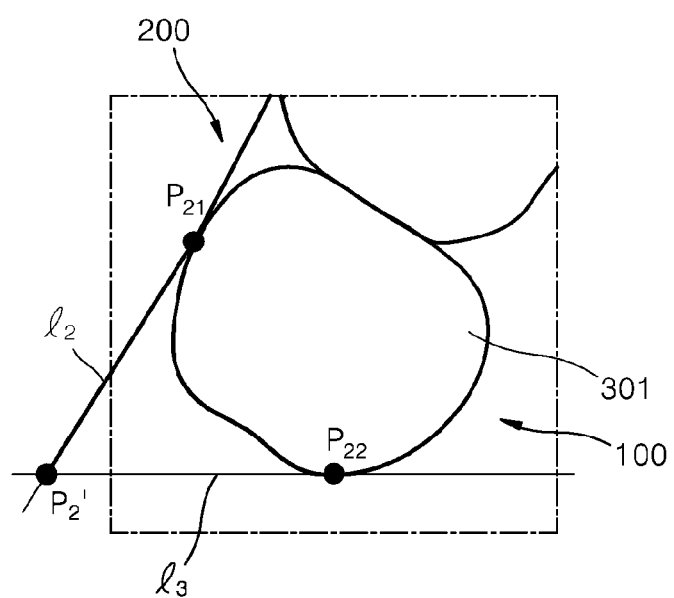
FIG. 8 is a view for explaining a process of generating side points from the three-dimensional model.

FIG. 8 is for explaining a process of generating a side point P2' from the three-dimensional model 100. Referring to FIG. 8, the side point may be a point formed at a predetermined distance from the initial archline 200. For example, in the Spee curve generation method according to the present disclosure, at least some of the points may be generated at an intersection between a line passing through the contour point of the molar tooth among the teeth and tangent to the contour of the molar tooth and a line horizontal to the rearmost contour point of the molar tooth. More specifically, the side point among the points may be generated at a line tangent to the contour of the molar tooth and a line horizontal to the rearmost contour point of the molar tooth. At this time, the contour point of the molar tooth may be a reference point on an archline tangent to the contours of at least some of the teeth. More specifically, on the basis of the patient having 14 teeth in the maxilla, the contour point of the molar tooth may set the contour point Pa of tooth #1 301 as the reference point. When generating another side point, the contour point of the molar tooth may set the contour point Pf of tooth #14 314 as the reference point. However, it is not necessarily limited thereto, and tooth #3 303, tooth #6 306, and the like may be used as needed.

Meanwhile, the slope of a second line 12 passing through the contour point of the molar tooth and tangent to the contour of the molar tooth may be the same as the slope of the initial archline 200 at the tooth #1 contour point Pa. At this time, the tooth #1 contour point Pa corresponds to the contour point P21 of the molar tooth. The initial archline 200 is formed in the form of a three-dimensional curve, and the slope of the second line 12 is also formed to be the same as the instantaneous slope of the initial archline 200 at the tooth #1 contour point Pa. That is, the second line 12 may act like an extension of the initial archline 200.

In addition, the rearmost contour point P22 may mean a contour point located at the rearmost of tooth #1 301. A third line 13 may be formed to pass through the rearmost contour point P22 and tangent to the contour of tooth #1 301. For example, the third line 13 may be formed parallel to one corner of the boundary box enclosing tooth #1 301 and passing through the rearmost contour point P22.

The first side point P2' generated at tooth #1 301 may be generated at a point where the second line 12 and the third line 13 extend and intersect. In general, in the three-dimensional model 100, since teeth are gradually formed higher from an incisor to a molar tooth, the first side point P2 may also be generated at the same location as or higher than the contour point P21 of the molar tooth. On the other hand, the central point for the incisor may express a portion where a tooth is located in the foremost of the three-dimensional model 100, and the first side point P2' may express a portion where a tooth is located in the rearmost of the three-dimensional model 100.

Meanwhile, the above-described contents have been described as an example of a method of generating the first side point P2' which is one side of the three-dimensional model 100, but the second side point (not shown), which is another side, may also be generated using the same method.

Hereinafter, a process of generating a side point from the three-dimensional model according to another embodiment of the present disclosure will be described.

Figure 9:
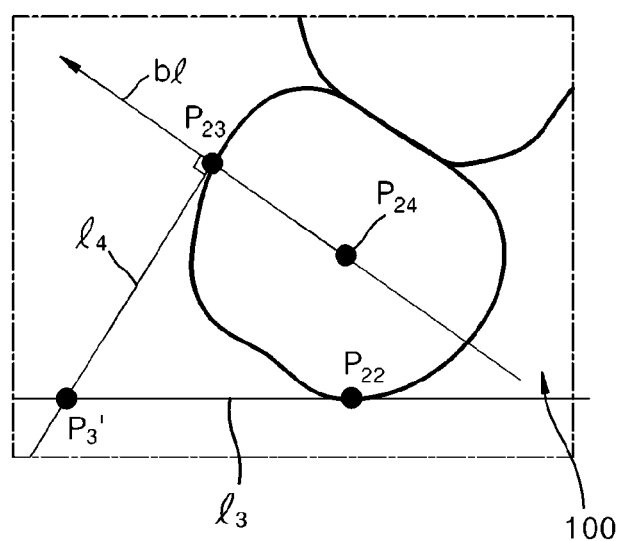
FIG. 9 is a view for explaining a process of generating side points from the three-dimensional model according to another embodiment.

FIG. 9 is a view for explaining a process of generating the side point from the three-dimensional model according to another embodiment. Referring to FIG. 9, in the archline optimization method according to another embodiment of the present disclosure, another contour point P23 of the molar tooth may be a point at which a buccal line bl passing through the center P24 of a tooth and the contour of the molar tooth intersect. At this time, the molar tooth may be tooth #1 301. In the center of a virtual circle which is generated to pass through the centers of teeth (not shown) on both sides adjacent to the center P24 of the relevant tooth, the buccal line bl may mean a line extending from the center of the virtual circle toward the center P24 of the tooth.

Meanwhile, another first side point P3' may be determined as a specific point spaced apart by a predetermined distance from another contour point P23 of tooth #1 301. For example, the another first side point P3' may be determined as a specific point on the third line 13 spaced apart from the another contour point P23 of tooth #1 301.

As another example, another first side point P3' may be determined as a point at which a line extending from another contour point P23 and the third line 13 meet. More specifically, a fourth line 14 having a direction perpendicular to the buccal line bl may be formed at the another contour point P23 of tooth #1 301. The fourth line 14 may extend in one or both directions and may intersect the third line 13 passing through the rearmost contour point P22. At this time, a point at which the third line 13 and the fourth line 14 intersect may be determined as the another first side point P3'.

The above-described contents have been described based on a patient with 14 teeth in the maxilla, but can also be applied to a patient with 16 teeth in the maxilla. In addition, it goes without saying that the above process can be performed using data of the patient's mandible as well as the maxilla.

Hereinafter, a process of projecting a central point and a side point on a predetermined plane will be described.

Figure 10:
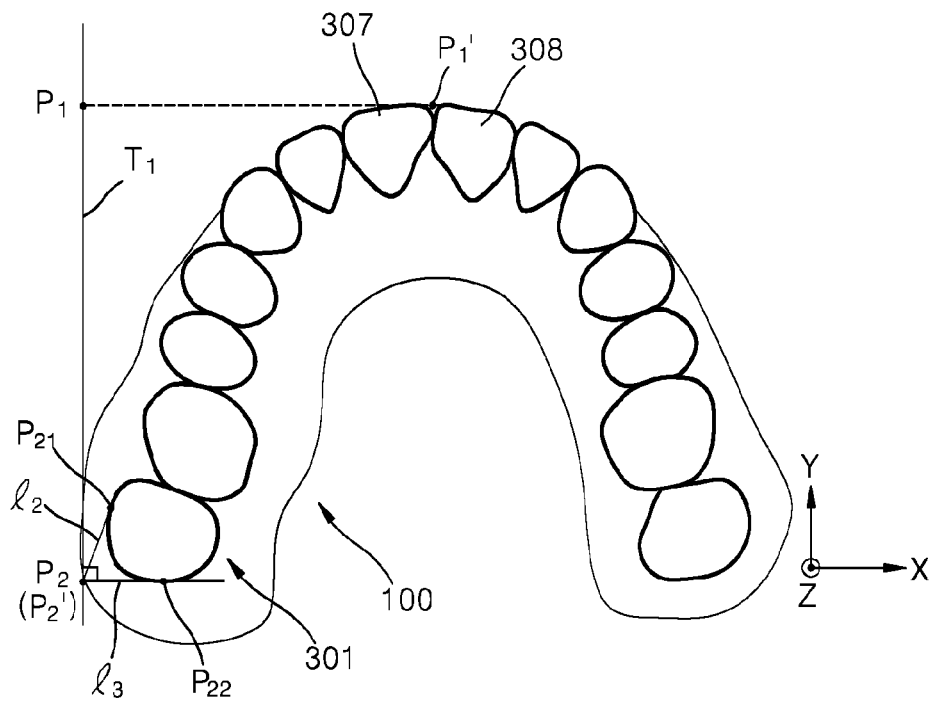
FIG. 10 is a view for explaining a process of projecting the central point onto a predetermined plane.

FIG. 10 is a view for explaining a process of projecting a central point on a predetermined plane. Referring to FIG. 10, the archline optimization method according to the present disclosure further includes the step S150 of projecting points on the predetermined plane. In the step S150 of projecting the points on the predetermined plane, the central point P1' and the first side point P2' may be projected. For example, the points may be projected on the plane including a side point generated based on a molar tooth among the teeth. More specifically, a projection plane T1 including the first side point P2' may be formed. The projection plane T1 may have a normal vector parallel to the third line 13. The central point P1' may be projected at the shortest distance on the projection plane T1. That is, the central point P1' may be projected perpendicular to the projection plane T1. As the central point P1' is projected on the projection plane T1, the projected central point P1 is generated, and the first side point P2' and the projected first side point P2 may be the same. Accordingly, the projected central point P1 and the projected first side point P2 may be disposed on the same plane. When the projection plane T1 includes the first side point P2', the first side point P2' and the projected first side point P2 may be the same, so that the process of projecting the first side point P2' can be omitted and the system resources can be saved.

However, it is merely exemplary that the points can be projected on the plane including the side point, and it will also be possible for the points to be projected on a plane that does not include any points.

Hereinafter, a process of generating a Spee curve will be described.

Figure 11:
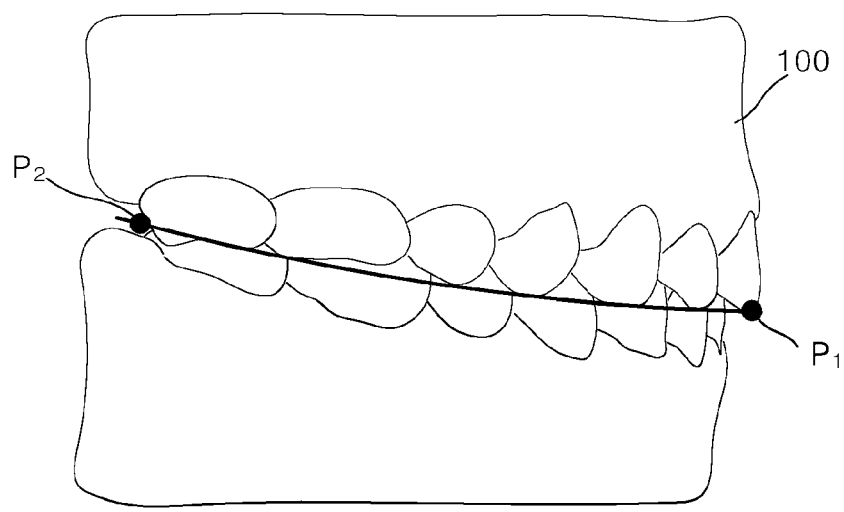
FIGS. 11 and 12 are views for explaining a process of generating a Spee curve on the side of the three-dimensional model.
Figure 12:
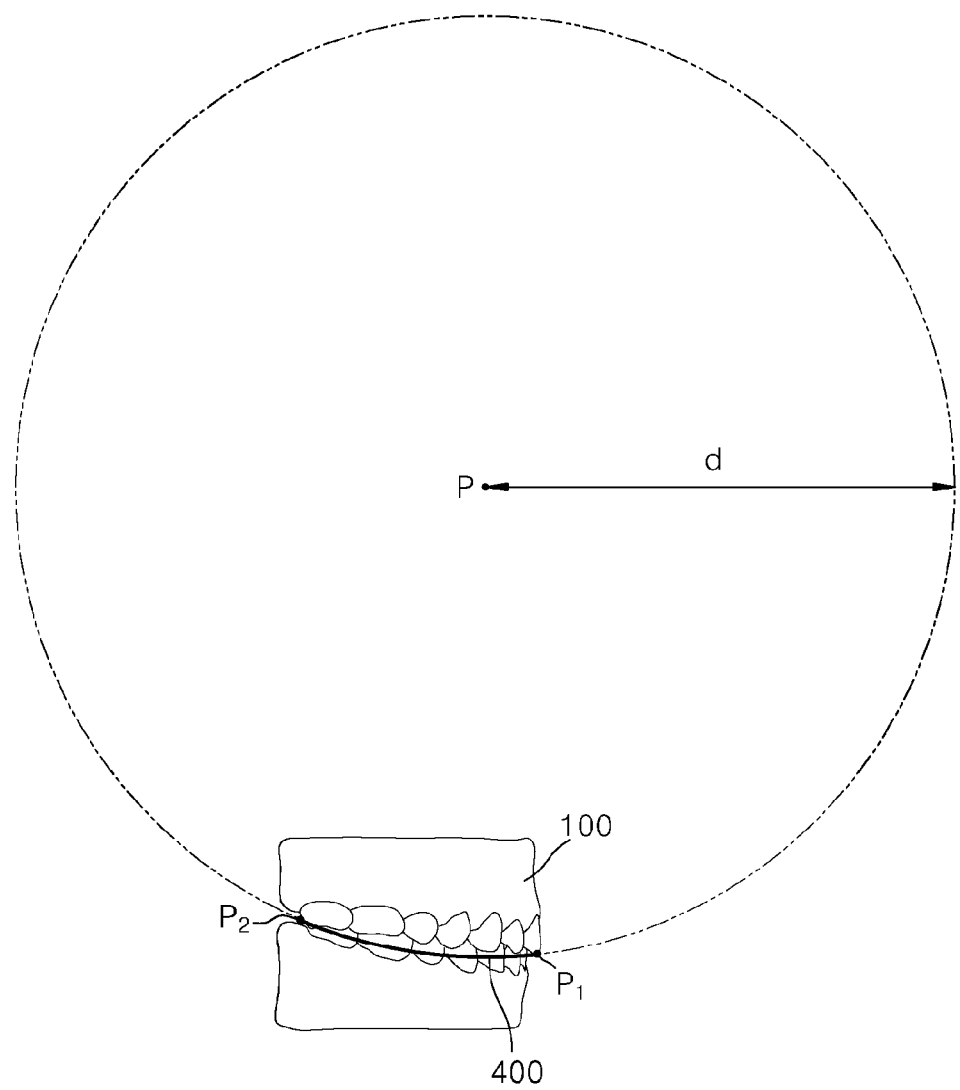

FIGS. 11 and 12 are for explaining a process of generating a Spee curve on the side of the three-dimensional model.

Referring to FIGS. 11 and 12, the projected central point P1 and the projected first side point P2 disposed on the same projection plane T1 constitute an arc of a circle having a predetermined curvature radius d, and a Spee curve 400 may be generated (S160) based on the arc. For example, the Spee curve 400 may be a two-dimensional arc which is a portion of the circumference, and the projected central point P1 and the projected first side point P2, which are the projected points, may form both ends of the Spee curve 400. In addition, the Spee curve connects the projected central point P1 and the projected first side point P2 with a curve, and may have a curvature radius d minimizing a deviation from the ends of the teeth. For example, when generating the Spee curve 400 using the maxilla data of the three-dimensional model, the curvature radius d may be determined to minimize a distance deviation between the Spee curve 400 and the ends of the teeth constituting the maxilla. As a method of minimizing the distance deviation, the sum of distances, the sum of areas, or the root mean square of distances to the ends of the teeth on the basis of the Spee curve 400 may be used, but is not limited thereto, and any method for acquiring the optimal Spee curve 400 may be used.

Figure 13:
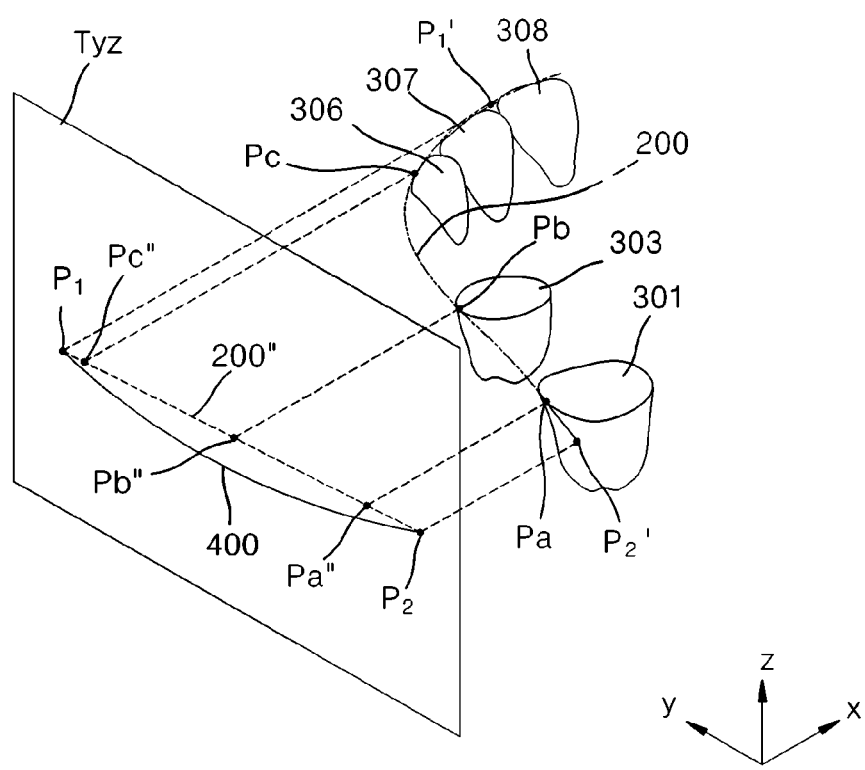
FIG. 13 is a view for explaining a process of generating the Spee curve by projecting the central point and the side points on a predetermined plane.

However, unlike the above description, the projection plane T1 may not necessarily include the first side point P2'. FIG. 13 is a view for explaining a process of generating a Spee curve by projecting the central point P1' and the side point on a predetermined plane. Meanwhile, in FIG. 13, only a portion necessary for convenience of description is shown, and the remaining portions are omitted.

Referring to FIG. 13, the central point P1' and the first side point P2' may be generated in the three-dimensional model. The central point P1' and the first side point P2' may be projected onto a predetermined plane to generate the Spee curve 400, and the predetermined plane may be a yz projection plane Tyz. The yz projection plane Tyz may include the projected central point P1 and the projected first side point P2, and the Spee curve 400 including the projected central point P1 and the projected first side point P2" (400) may be acquired in the yz projection plane Tyz. In addition, the contour points Pa, Pb, and Pc of the teeth may be projected on the yz projection plane Tyz to form other projected contour points Pa", Pb", and Pc". Using the contour points Pa, Pb, and Pc corresponding to the projected contour points Pa", Pb", and Pc", the central point P1' corresponding to the projected central part P1, and the first side point P2' corresponding to the projected first side point P2, an archline may be changed based on the generated Spee curve 400, and the changed archline may be applied to the three-dimensional model. Meanwhile, according to the above-described contents, the process of generating the Spee curve 400 using the central point P1' and the first side point P2' has been described, but it may also be possible to generate the Spee curve 400 using the central point P1' and another first side point P3'.

Hereinafter, the step S170 of changing the three-dimensional archline based on the generated Spee curve 400 and applying it to the three-dimensional model will be described in detail.

Figure 14:
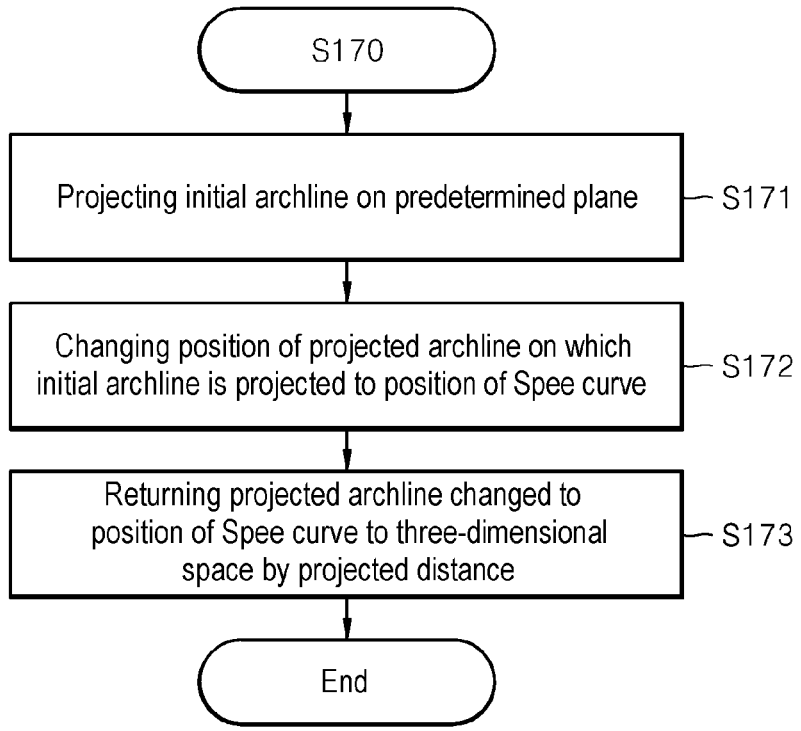
FIG. 14 is a detailed flowchart of S170 in the archline optimization method according to the present disclosure.
Figure 15:
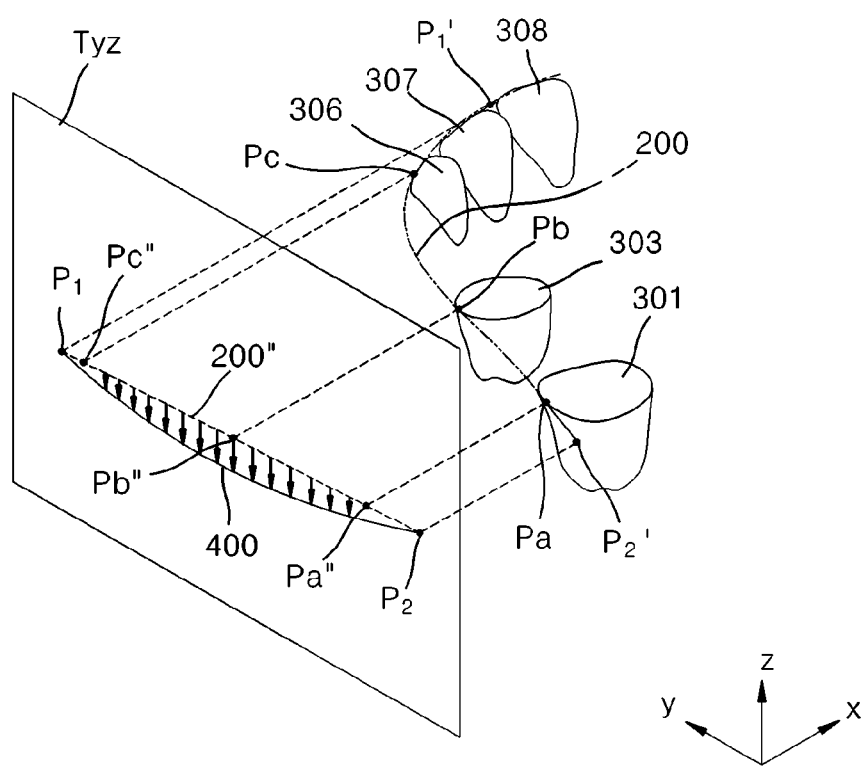
FIGS. 15 and 16 are views for explaining a process of changing the archline based on the generated Spee curve.
Figure 16:
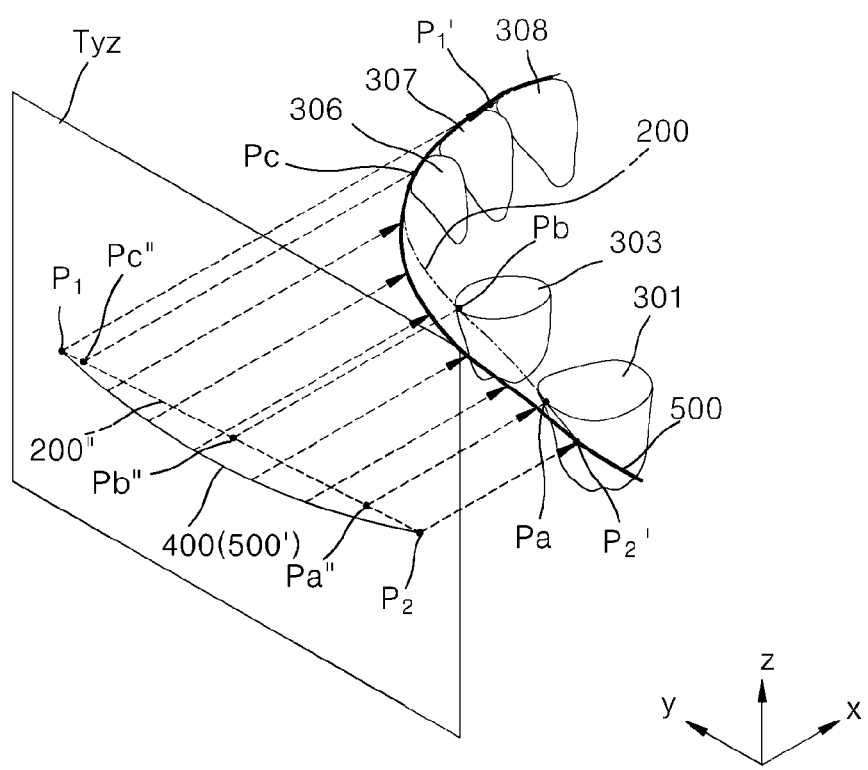

FIG. 14 is a detailed flowchart of S170 in the archline optimization method according to the present disclosure, and FIGS. 15 and 16 are for explaining a process of changing the archline based on the generated Spee curve.

Referring to FIGS. 14 to 16 overall, in the archline optimization method according to the present disclosure, in the step S170 of changing the archline, the initial archline 200 may be changed based on the Spee curve 400 formed on a predetermined plane, and the changed archline is referred to as a final archline 500 for the sake of convenience.

More specifically, the step S170 of changing the archline includes a step S171 of projecting the initial archline 200 on the predetermined plane. In order to generate the Spee curve 400, the central point P1' and the first side point P2' may be projected on the yz projection plane Tyz to generate the projected central point P1 and the projected first side point P2, and the initial archline 200 can also be projected on the yz projection plane Tyz. That is, the three-dimensional initial archline 200 is projected on the yz projection plane Tyz to generate a second projected archline 200". In this process, a projection distance between the points constituting the three-dimensional initial archline 200 and the corresponding points of the second projected archline 200" generated when the three-dimensional initial archline 200 is projected on the yz projection plane Tyz may be measured.

When the initial archline 200 is projected on the yz projection plane (Tyz) to generate the second projected archline 200", a step S172 of changing the position of the projected archline on which the initial archline 200 is projected (more specifically, the second projected archline 200") to the position of the Spee curve 400 generated on the predetermined plane may be performed. For example, the position of the second projected archline 200" may be changed to the position of the Spee curve 400 generated on the yz projection plane Tyz, and more specifically, the z coordinate of the second projected archline 200" may be changed to correspond to the z coordinate of the Spee curve 400.

After changing the position of the second projected archline 200", the second projected archline 200" can be returned to the three-dimensional space by a projected distance (S173). The second projected archline 200" is changed to a position corresponding to the Spee curve 400 in the yz projection plane Tyz to generate a projected final archline 500'. The projected final archline 500' may be returned to the three-dimensional space and formed as the final archline 500, which is a new archline, of the three-dimensional model 100. In order for the projected final archline 500' to be formed as the final archline 500, the points constituting the projected final archline 500' are moved onto the three-dimensional space by an x-axis distance (projection distance) that has been moved when the initial archline 200 is projected on the yz projection plane Tyz, to form the final archline 500. For example, the final archline 500 may have the same x coordinate and y coordinate as the initial archline 200, but may have the z coordinate optimized based on the Spee curve 400. That is, a shape obtained by projecting the final archline 500 on the yz projection plane Tyz may be the same as the Spee curve 400. The final archline 500 generated in this way can replace the initial archline 200, can express a natural smile line more optimized for the patient's oral cavity, as compared to the initial archline 200, and can provide an optimal treatment plan for the patient.

According to the above-described contents, the projected central point P1 and the projected first side point P2 are determined by projecting the central point P1' and the first side point P2', which are determined in the three-dimensional model, on the yz projection plane Tyz. Meanwhile, the projected central point P1 and the projected first side point P2 may be directly determined on the yz projection plane Tyz.

As an example, when the second projected archline 200" is generated, points located within a predetermined radius from both ends of the second projected archline 200" may be determined as the projected central point P1 and the projected first side point P2, respectively. At this time, the second projected archline 200" may be acquired by projecting at least two points included in the initial archline 200 on the yz projection plane Tyz. For example, the at least two points may be the contour point Pa of tooth #1 301 and the contour point Pc of tooth #6 306. The projected contour points Pa" and Pc" may form both ends of the second projected archline 200", and arbitrary points within a predetermined radius range in the yz projection plane Tyz centered on each of the projected contour points Pa" and Pc" may be determined as the projected central point P1 and the projected first side point P2. Of course, the Spee curve 400 may be generated based on the projected central point P1 and the projected first side point P2.

Hereinafter, a Spee curve generation apparatus 10 according to the present disclosure will be described. In describing the Spee curve generation apparatus, the contents already described in the above-described Spee curve generation method is briefly mentioned or omitted.

Figure 17:
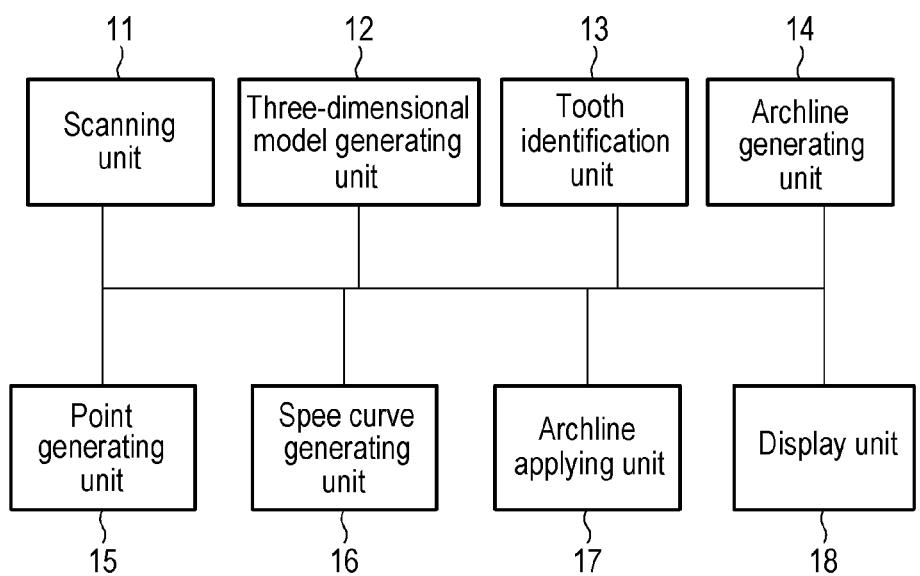
FIG. 17 is a configuration diagram of an archline optimization apparatus according to the present disclosure.

FIG. 17 is a configuration diagram of the archline optimization apparatus 10 according to the present disclosure. Referring to FIG. 14, the archline optimization apparatus 10 according to the present disclosure includes a scanning unit 11. The scanning unit 11 acquires image data of the inside of the patient's oral cavity. At this time, the image data of the inside of the patient's oral cavity may be image data of the actual patient's oral cavity or image data of a plaster model obtained by taking an impression of the oral cavity. The image data may be two-dimensional plane data, but is not limited thereto. The acquired image data may be stored in a database unit (not shown) of the archline optimization apparatus 10. The database unit may be a physical storage device or may mean a virtual cloud storage space.

In addition, the archline optimization apparatus 10 includes a three-dimensional model generating unit 12. The three-dimensional model generating unit 12 converts the image data acquired from the scanning unit 11 into a three-dimensional model. The three-dimensional model expresses information on the inside of the patient's oral cavity including the teeth in a three-dimensional manner on a user interface, and the user can analyze the patient's oral cavity using the three-dimensional model and provide an optimal treatment plan. The archline optimization apparatus 10 may generate a Spee curve using at least a portion of the three-dimensional model and may use at least one of maxillary data and mandibular data as an example.

In the converted three-dimensional model, the teeth are segmented by a tooth identification unit 13 so that each tooth can be individually identified. The tooth identification unit 13 may apply the characteristics of each tooth to the three-dimensional model by the database unit, identify teeth matching the corresponding characteristics, and assign tooth numbers to the identified teeth. For example, in the maxilla data, tooth numbers may be assigned sequentially from the left tooth, and a process of assigning the tooth numbers is the same as described above.

Meanwhile, the archline optimization apparatus 10 according to the present disclosure may include an archline generating unit 14. The archline generating unit 14 may generate an initial archline based on the three-dimensional model acquired by the three-dimensional model generating unit 12 and the data of the teeth individually identified by the tooth identification unit 13. The initial archline may be generated based on a predetermined tooth in the three-dimensional model of the teeth acquired by scanning the patient's teeth before orthodontic treatment. Since a process of generating the initial archline is the same as described above, detailed explanation thereof will not be repeated.

Meanwhile, the archline optimization apparatus 10 according to the present disclosure includes a point generating unit 15 that generates at least two points based on a plurality of teeth from the three-dimensional model. The point generating unit 15 may generate points to be used to generate a Spee curve. The points to be generated include at least one central point generated based on an incisor among the teeth and at least one side point generated based on a molar tooth among the teeth. For example, a first central point and a first side point may be generated to generate a first Spee curve on the left side of the three-dimensional model, and a second central point and a second side point can be generated to generate a second Spee curve on the right side of the three-dimensional model.

In this case, the first central point and the second central point may be the same. As described above, the central point may be generated through the outer surface of the boundary box of specific teeth, and the specific teeth may be incisors including teeth #7 and #8 on the basis of the oral cavity of the patient having 14 teeth in the maxilla. More specifically, the central point may be the center of a first line connecting front opposite vertices of the boundary boxes of the incisors. In this way, by using the same central point when generating the first and second Spee curves, there is an advantage in that the system resources can be saved.

On the other hand, when teeth #7 and #8 corresponding to the incisors are spaced apart from each other by a predetermined distance, only tooth #7 may be used to generate the first central point when generating the first Spee curve, and only tooth #8 may be used to generate the second central point when generating the second Spee curve. In this case, by using different central points, there is an advantage in that sophisticated first Spee curve and second Spee curve can be acquired.

In addition, the point generating unit 15 may generate side points, and the generated side points may be generated at an intersection between a line passing through the contour point of the molar tooth and tangent to the contour of the molar tooth and a line horizontal to the rearmost contour point of the molar tooth. For example, the molar tooth may be tooth #1. At this time, the contour point of the molar tooth may be a reference point on an archline passing through the contours of at least some of the teeth, and the archline may be generated by the archline generating unit 14. The archline may be a three-dimensional line expressing the shape of the dental arch, and the archline may be formed to pass through the contours of tooth #1, tooth #3, and tooth #6.

In addition, the side point may be generated by an intersection between a line perpendicular to the buccal line and a line horizontal to the rearmost contour point of the molar tooth. A process of generating the side points is the same as described above.

Meanwhile, a Spee curve generating unit 16 projects the generated points (the central point and the side point) on a predetermined projection plane. As an example, the Spee curve generating unit 16 may generate a projection plane including the side point and may project the central point on the projection plane as the shortest distance. The projection plane may be generated to be parallel to the yz plane, and since the central point is projected on the projection plane, the Spee curve may be flatly displayed when the three-dimensional model is viewed from one side. However, the projection plane does not necessarily include the side point, but points may be projected on the projection plane that does not include the central point and the side point, so that a Spee curve can be generated.

The Spee curve generating unit 16 may generate the Spee curve so that the projected points form an arc having a predetermined radius of curvature from a predetermined center of curvature. At this time, the center of curvature may be placed outside the three-dimensional model, and the radius of curvature may be determined as a value that minimizes a deviation of the Spee curve from the ends of the teeth. In this way, since the Spee curve is determined as a value that minimizes the deviation from the ends of the teeth, it is possible to acquire a Spee curve that most closely matches the actual oral cavity.

Meanwhile, the archline optimization apparatus 10 according to the present disclosure further includes an archline applying unit 17. The archline applying unit 17 may change the initial archline into the final archline based on the Spee curve generated by the Spee curve generating unit 16. The changed archline (i.e., the final archline) may have a shape more suitable for the patient's oral cavity, and may provide a natural smile line to the patient. The archline applying unit 17 projects the initial archline on a predetermined plane, generates the projected final archline by matching the projected initial archline to the Spee curve generated by the Spee curve generating unit 16, and returns the final archline to the three-dimensional space. Through the final archline, there are advantages in that the user can provide the patient with a patient-customized archline and provide the patient with an optimal treatment plan.

Meanwhile, at least some of the processes performed by the above components may be visually displayed to the user through a display unit 18. The display unit 18 may be a component that allows the user to visually recognize the processes performed by the archline optimization apparatus 10, and may be, for example, a monitor device, a tablet device, and the like. The user can visually and easily check at least one of the generated initial archline, Spee curve, and final archline through the display unit 18, and can establish a treatment plan suitable for the patient based on the acquired final archline.

The above description is merely an example of the technical ideas of the present disclosure, and various modifications and variations can be made by those skilled in the art without departing from the essential characteristics of the present disclosure.

Therefore, the embodiments disclosed in the present disclosure are intended to explain and not limit the technical ideas of the present disclosure, and the scope of the technical ideas of the present disclosure is not limited by these embodiments. The protection scope of the present disclosure should be construed according to the claims below, and all technical ideas within the equivalent range should be construed as being included in the scope of the present disclosure.

INDUSTRIAL APPLICABILITY

The present disclosure provides an archline optimization method for providing a patient-specific treatment plan to a patient by generating a Spee curve in a three-dimensional model representing the oral cavity of a patient and optimizing an archline based on the generated Spee curve, and an apparatus using the same.

What is claimed is:
1. An archline optimization method comprising:
 generating an initial archline;
 generating a Spee curve based on an arc of a circle having a predetermined radius of curvature; and
 changing a three-dimensional archline based on the Spee curve,
 wherein the changing the three-dimensional archline comprises:
  projecting the initial archline on a predetermined plane;
  changing a position of a projected archline obtained by projecting the initial archline to a position of the Spee curve generated on the predetermined plane; and
  returning the projected archline changed to the position of the Spee curve to a three-dimensional space by a projected distance, and
 wherein the initial archline is generated based on a predetermined tooth in a three-dimensional model of a patient's teeth acquired by scanning the teeth before orthodontic treatment.

2. The archline optimization method of claim 1, wherein in the generating the Spee curve, at least two points constituting the arc are generated on a predetermined plane, and wherein the Spee curve is a two-dimensional arc on the predetermined plane including the points.

3. The archline optimization method of claim 1, wherein at least two points constituting the arc are generated based on a plurality of teeth and projected on a predetermined plane, and the Spee curve is a two-dimensional arc on the predetermined plane including the points.

4. The archline optimization method of claim 1, wherein at least two points constituting the arc includes at least one central point generated based on an incisor among teeth and at least one side point generated based on a molar tooth among the teeth.

5. The archline optimization method of claim 1, wherein at least some of at least two points constituting the arc include a side point generated at an intersection between a line passing through a contour point of a molar tooth among teeth and tangent to the contour of the molar tooth and a line horizontal to the rearmost contour point of the molar tooth.

6. The archline optimization method of claim 5, wherein the contour point of the molar tooth is a reference point on an archline tangent to the contours of at least some of the teeth.

7. The archline optimization method of claim 1, wherein at least some of- at least two points constituting the arc include a central point generated through an outer surface of a boundary box of teeth.

8. The archline optimization method of claim 7, wherein the central point is generated between boundary boxes of incisors among the teeth.

9. The archline optimization method of claim 8, wherein the central point is a center of a line connecting front opposite vertices of the boundary boxes of the incisors.

10. The archline optimization method of claim 9, wherein the Spee curve has the radius of curvature that minimizes a deviation from the ends of the teeth.

11. An archline optimization method comprising:
generating a two-dimensional Spee curve on a predetermined plane, the Spee curve having a predetermined radius of curvature; and
projecting an initial archline on the predetermined plane, the initial archline being generated from a three-dimensional model of a patient's teeth acquired by scanning teeth before orthodontic treatment;
generating a three-dimensional archline by changing the projected initial archline based on the Spee curve,
wherein a projection of the archline on a predetermined plane is the same as the Spee curve.

12. The archline optimization method of claim 11, wherein the Spee curve includes a projected point at which at least two points generated based on a three-dimensional model of the patient's teeth acquired by scanning the teeth before orthodontic treatment are projected on the predetermined plane.

* * * * *